J. W. JONES.
COTTON CHOPPER.
APPLICATION FILED APR. 7, 1920.

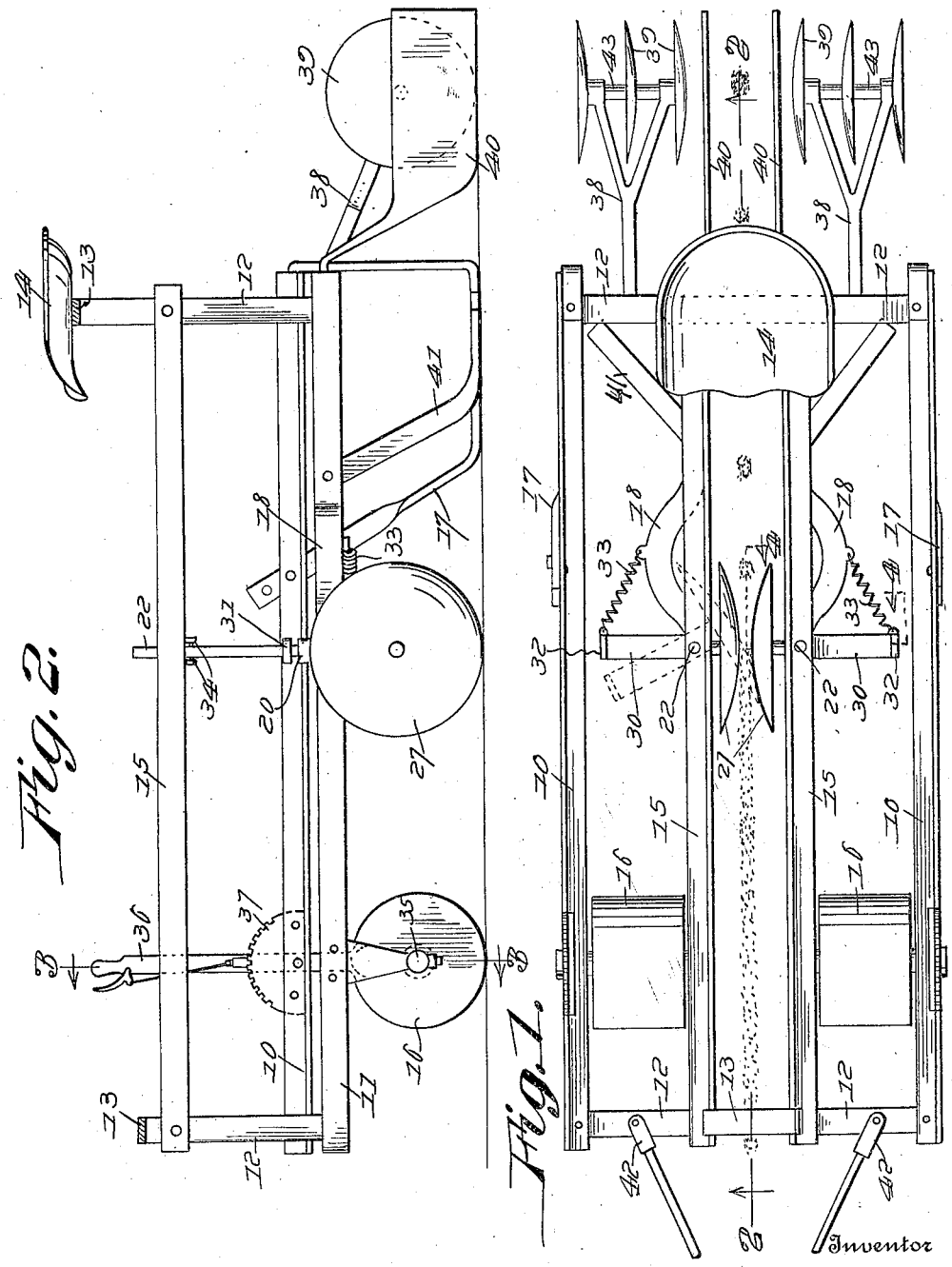

1,359,709.

Patented Nov. 23, 1920.
2 SHEETS—SHEET 2.

Inventor
J. W. Jones,
By Watson E. Coleman
Attorney

UNITED STATES PATENT OFFICE.

JOHN W. JONES, OF BYERS, TEXAS.

COTTON-CHOPPER.

1,359,709.  Specification of Letters Patent.  Patented Nov. 23, 1920.

Application filed April 7, 1920. Serial No. 371,953.

*To all whom it may concern:*

Be it known that I, JOHN W. JONES, a citizen of the United States, residing at Byers, in the county of Clay and State of Texas, have invented certain new and useful Improvements in Cotton-Choppers, of which the following is a specification, reference being had to the accompanying drawings.

This invention relates to agricultural machinery, and particularly to cotton choppers.

The general object of my invention is to provide a cotton chopper including a supporting frame with a pair of disk cutters so mounted on the supporting frame that they may be alternately turned from a position parallel with the row into a position at an angle thereto so as to chop out the cotton while the machine is being drawn over the ground.

A further object is to provide a mechanism of this kind in which the disk cutters are disposed each on a vertical shaft, each shaft being provided with a projecting arm forming a foot support so that the operator, by alternately retracting one leg and projecting the other, may alternately turn one disk into the row and the other disk out of the row to thus chop the cotton.

A further object is to provide a mechanism of this kind in which the draft, that is the drag, of the machine may be controlled so as to compensate for the superior strength of one of the draft animals over the other draft animal and thus keep the machine moving in line with the row at all times.

Other objects have to do with means whereby weeds may be cut away on each side of the row, whereby the ground between the rows may be cut and harrowed, and whereby the earth thrown up from said cutters or harrows may be prevented from being thrown upon the cotton plants.

Other objects will appear in the course of the following description.

My invention is illustrated in the accompanying drawings, wherein:—

Figure 1 is a top plan view of the cotton chopper constructed in accordance with my invention;

Fig. 2 is a side elevation of the construction shown in Fig. 1;

Figure 3:
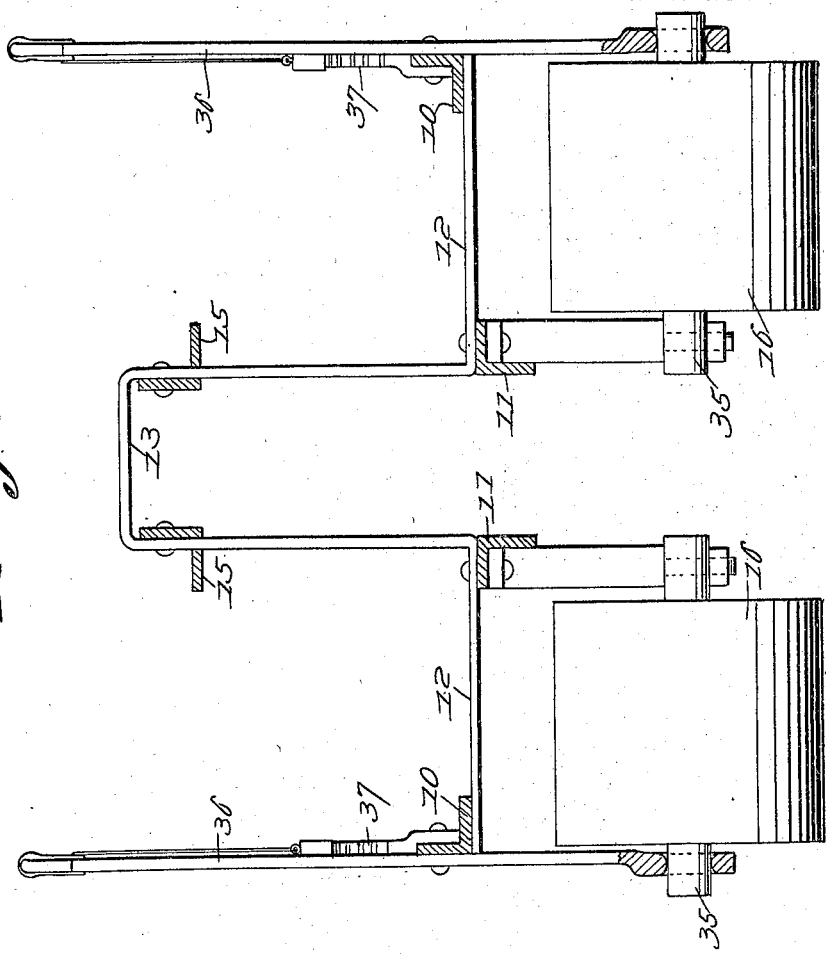
Fig. 3 is a section on the line 3—3 of Fig. 2.
Figure 4:
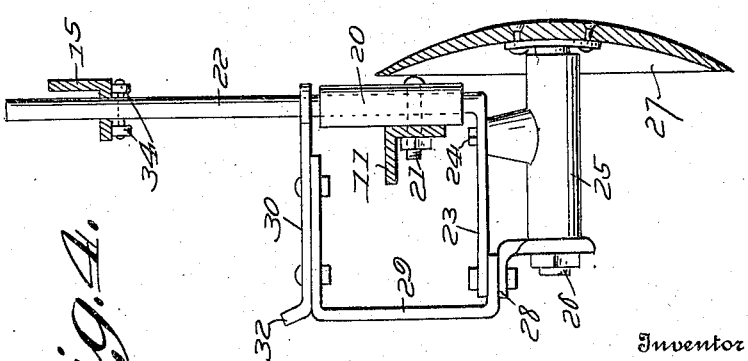
Fig. 4 is a detail sectional view of the mounting for the cotton chopping disk.

Referring to these drawings, it will be seen that my invention comprises a supporting frame consisting of outer longitudinal members 10 and inner longitudinal members 11, these members being made preferably of channel iron or angle iron. The members 10 are connected by transverse members 12, each formed at its middle with a central arch 13, the arch 13 of the rear transverse member 12 carrying a seat 14. These arches 13 are preferably connected by longitudinal beams 15 of angle iron or channel iron, as may be deemed fit.

At the forward end, the machine is shown as supported by means of rollers 16 which are mounted so that they may be shifted in a manner which will be hereafter stated, and at its rear end the frame is supported by means of runners 17 which are shown as attached to the rear ends of the longitudinal beams 10. I do not wish to be limited to the use of the rollers 16 or the runners 17, as I might use wheels at the forward and rear ends of the machine or use runners at both ends of the machine. I prefer, however, the combined use of runners and rollers as illustrated.

Intermediate their ends, the longitudinal beams 11, which are, of course, supported above the ground by the rollers and runners, are outwardly deflected or bowed, at 18, and clamped upon each of the beams 11 just in advance of this outwardly bowed portion 18 is a tubular sleeve 20 which is clamped to the corresponding beam 11 by means of a U-bolt 21 or like clamping device. Passing vertically through this sleeve is a spindle 22 which carries at its lower end a disk cutter and which is provided with a foot support, as illustrated. This spindle 22 extends down through the sleeve 20 and is angularly bent, at 23, and flattened and is perforated for the passage of a stud 24 on the barrel 25 which constitutes a bearing for the disk cutter shaft 26 having thereon the disk cutter 27, which is, of course, concavo-convex. Extending from the outer end of the barrel 25 is a lug 28, and disposed between the lug 28 and the portion 23 of the spindle is an angular iron 29 which extends outward and then upward and then inward, and is attached to an iron 30, which in turn has an eye 31 encircling the spindle. The extremity of this iron 30 is upwardly bent, as at 32, whereby iron 30 forms a foot rest. A spring 33 is attached to the outer end of this iron 30 and extends rearward and is connected to any suitable portion of the frame, as to the bowed portion 18, so as to normally retract the iron and hold it in a retracted position with the disk cutter 27 extending parallel to the line of draft.

The upper end of the spindle 22 carries a transversely extending pin provided with rollers 34 which bear against the under face of the corresponding longitudinal beam 15, these rollers constituting anti-friction elements which resist any upward pressure on the spindle and form a bearing for the upper end of the spindle and permit its free rotation.

The operator, sitting on the seat 14, places his feet on the foot rests formed by the bars 31 with their upturned ends 32. Normally when these foot rests are retracted by the springs 33, the disk cutters 27 will travel parallel to the row and on each side of the row, but when the operator projects one or the other leg, the corresponding disk cutter will be turned into angular relation to the row. It is obvious that by alternately projecting one leg and retracting the other, that the disk cutters will be alternately turned into and out of the rows. Of course, it will be understood that after one disk cutter has been turned out of the row, the other disk cutter is turned into the row enough in advance of the first disk cutter to leave a suitable stand of cotton. Inasmuch as the amount of cotton which is to be left and the turning of the disk cutters is entirely within the control of the operator, it is obvious that he may make a selection of the cotton as he goes along and cut out that which is poor, leaving thoroughly good stands along the row.

The rollers 16 are each mounted on a shaft 35, which shaft has a swinging bearing on the longitudinal beams 11 so that the outer end of the shaft may be swung forward or rearward. This movement is controlled by a lever 36 which, at its lower end, engages the shaft 35 and which is pivoted upon a sector 37. The lever 36 is provided with the usual hand operated dog for engaging this sector so that the lever may be set in adjusted positions. Normally, of course, the rollers will be disposed at right angles to the line of draft, but if one draft animal pulls more strongly than the other draft animal, or if there is a tendency of the machine to slew, then by shifting one or the other levers 30, the corresponding roller 16 may be shifted into angular relation to the line of draft, thus causing the machine to have a tendency to move sidewise or resist the pull of the draft animal on that side, thus evening up the draft and guiding the machine. Thus, a constant compensation may be made for too great pull on one side of the machine.

Rearward of the frame of the machine, I provide means whereby cultivating harrow disks may be supported so as to harrow the ground between the rows. I have shown for this purpose a transverse axle 43 on each side of the machine held to the frame by means of flexible connections 38, this axle carrying the harrow disks 39. In order to prevent these disks from throwing the earth upon the cotton plants in the row, I provide longitudinally extending shields 40 which are attached to the rear of the frame and extend between the row and the gangs of harrows. Preferably, also, I provide weed cutters 41 attached to the beams 11 rearward of the chopping disks 27 and designed to cut the weeds on each side of the row. The draft chains or other draft devices are attached by clips 42 to the forward arch 13.

This cotton chopper I have found to be extremely effective in actual use and to be relatively light, compact and strong. Inasmuch as the choppers are entirely under the control of the operator, there is no danger of thinning out the good places in the row of plants and leaving the stand at the poor places, as there is where the choppers are actuated mechanically and at predetermined and even distances apart.

While I have illustrated the use of foot levers or pedals 30 attached to the shafts 22 and operating to oscillate these shafts so as to turn the disks 27 into or out of the row, I do not wish to be limited to the use of foot levers, as hand levers might be connected to the shafts 22 in such position that they would be convenient to the driver sitting on the seat 14 and whereby these shafts might be oscillated. Neither do I wish to be limited to the use of the disks 27 as the means for cutting out the row, as plows might be attached to the vertical shafts 22 and operate in the same manner as the disks. It will be seen, therefore, that my broad idea is the use of one or more ground working or cutting implements mounted on the shafts 22 and shiftable manually into or out of an active position where they will chop the cotton.

I claim:—

1. A cotton chopper including a supporting frame adapted to travel over a row, a cotton cutting out implement mounted upon the frame, a vertical spindle upon which the implement is mounted and disposed to one side of the longitudinal axis of the machine, and an arm projecting from the spindle whereby the spindle may be rotated to carry the implement into or out of cutting relation to the row.

2. A cotton chopper including a supporting frame adapted to travel over a row, a vertical spindle mounted for oscillation upon the frame and disposed to one side of the longitudinal axis thereof, a cutting out implement mounted upon the lower end of the said spindle and adapted to be shifted by oscillations of the spindle into or out of cutting engagement with the row, and an arm projecting from the spindle whereby the spindle may be rotated and formed to provide a foot pedal.

3. A cotton chopper including a supporting frame adapted to travel over a row, a spindle mounted upon said frame, an arm projecting from the spindle whereby the spindle may be oscillated, a cutting out implement carried by the end of the spindle and adapted to be shifted into or out of cutting engagement with the row by the oscillation of the spindle, a longitudinally extending bar through which the spindle passes, and anti-friction rollers on the spindle engaging said bar and resisting upward movement of the spindle.

4. A cotton chopping machine including a supporting frame having upper and lower longitudinal bars in line with each other, the lower bar being deflected in a horizontal plane at one point, a spindle rotatably mounted on the frame adjacent said deflected portion, and a rotatable cotton chopping disk carried by said spindle and shiftable with the spindle from a position parallel to the row into a position at an angle thereto, the deflected portion of the bar permitting the rotation of the disk into an angular relation to the line of draft, and means engaging said spindle whereby it may be rotated.

5. In a cotton chopper, a supporting frame having forward and rear arches and a pair of upper and lower beams connecting said arches, oppositely disposed, vertical spindles rotatably mounted on said beams, each carrying at its lower end a rotatable cutting disk, anti-friction means resisting upward movement of the spindles, springs urging said spindles in a direction parallel to the line of draft, and manually operable means for rotating the disks against the action of said springs to bring either disk independently of the other into an angular relation to the line of draft.

6. In a cotton chopper, a supporting frame having forward and rear arches and a pair of upper and lower beams connecting said arches, oppositely disposed, vertical spindles rotatably mounted on said beams, each carrying at its lower end a rotatable cutting disk, anti-friction means resisting upward movement of the spindles, springs urging said spindles in a direction parallel to the line of draft, manually operable means for rotating the disks against the action of said springs to bring either disk independently of the other into an angular relation to the line of draft, and means at the forward end of the frame for variably increasing or decreasing the draft on one side of the frame or the other.

In testimony whereof I hereunto affix my signature.

JOHN W. JONES.